United States Patent [19] [11] 3,855,058
Groos et al. [45] Dec. 17, 1974

[54] METHOD AND DEVICE FOR DISCRIMINATING BETWEEN AND SORTING FUEL ELEMENTS OF NUCLEAR REACTORS

[75] Inventors: Ekkehard Groos, Julich; Hans Ragoss, Stetternich, both of Germany

[73] Assignee: Hochtemperatur-Reaktorbau GmbH, Cologne, Germany

[22] Filed: Mar. 19, 1973

[21] Appl. No.: 342,126

[30] Foreign Application Priority Data
Mar. 18, 1972 Germany............................ 2213238

[52] U.S. Cl. ............. 176/19 R, 176/19 LD, 176/30
[51] Int. Cl........................ G21c 17/00, G21c 19/00
[58] Field of Search.......... 176/19 R, 19 LD, 30–32, 176/20, 45

[56] References Cited
UNITED STATES PATENTS

| 3,046,212 | 7/1962 | Anderson............................ 176/45 |
| 3,142,625 | 7/1964 | Wellborn .......................... 176/19 R |
| 3,650,894 | 3/1972 | Rausch et al. .................... 176/19 R |

Primary Examiner—Harvey E. Behrend
Attorney, Agent, or Firm—Toren, McGeady and Stanger

[57] ABSTRACT

In the disclosed method of distinguishing between and sorting fuel elements of a nuclear reactor, the fuel is in the form of coated fuel particles, such as spherical fuel elements, which are sluiced through the core of a high temperature reactor. The activity of the fuel elements is measured outside the core at a predetermined temperature whereupon, in dependence of the measured activity value, the fuel elements are either returned to the core or are discharged. In accordance with the invention, each fuel element is for this purpose individually maintained outside the core in a measuring chamber at a predetermined elevated temperature and for a predetermined dwell time. While a predetermined amount of inert gas is flown through said measuring chamber for contact with the fuel element, whereby liberated fission gas products from the fuel element intermingle with the inert gas. The activity of the gas mixture thus obtained is determined and, in dependence on the measuring value thus obtained, the fuel element, through suitable controls, is either recycled to the core of the reactor or is discharged, for example, to a disposal area.

21 Claims, 1 Drawing Figure

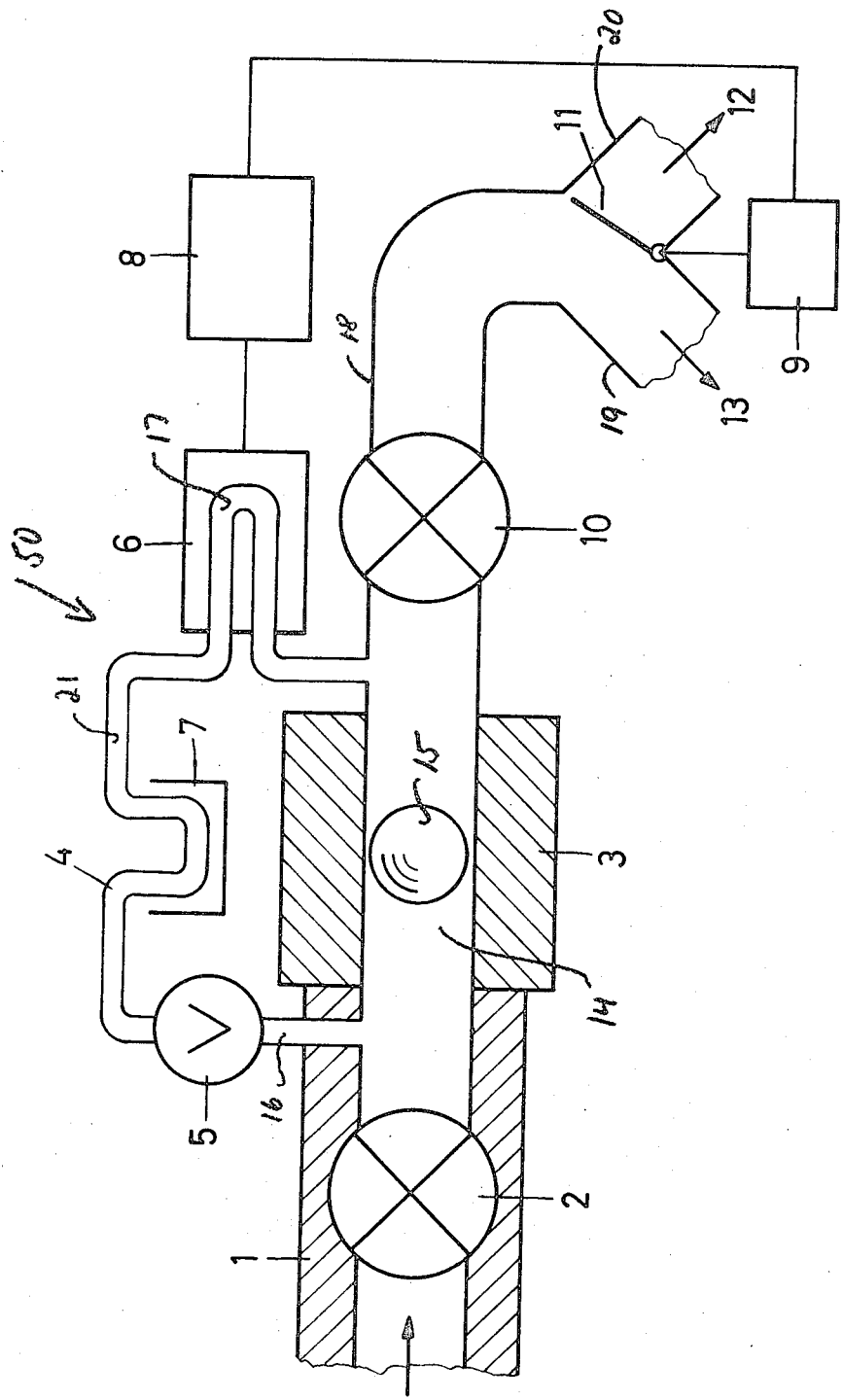

METHOD AND DEVICE FOR DISCRIMINATING BETWEEN AND SORTING FUEL ELEMENTS OF NUCLEAR REACTORS

The invention also discloses apparatus for carrying out the procedure. According to the apparatus aspect of the invention, the measuring chamber is a furnace space which can be heated to about above 600°C. The inlet end of the furnace space is connected to the fuel element discharge of the reactor in a valve controlled manner, while the outlet end of the space is selectively connectable, through switch means, with either the reactor or a disposal space. Conduits are provided for supplying inert gas to the furnace space and to withdraw the gas from the furnace space. A detector or measuring means is provided in the conduit through which the gas is withdrawn from the chamber. The measuring means measures the activity of the gas. The measuring means is operatively connected with an analyzer which in turn operates a control. The control operates the switch means in dependence on the measured activity value so as either to recycle the fuel elements to the reactor after they have been discharged from the furnace space or to convey them to the disposal space.

FIELD OF INVENTION

The invention is directed to a procedure and a device for discriminating between and sorting or segregating fuel elements of nuclear reactors, wherein the fuel is in the form of coated fuel particles. The inventive procedure and device are particularly suitable for use with spherical fuel elements which are passed or sluiced through the core of a high temperature reactor and wherein the fuel elements outside the reactor core are heated to or maintained at a given temperature by means of a furnace or the like, whereupon, after determining the radio activity of the fuel elements by means of suitable detector or measuring means, the fuel elements, in dependence on the measured value, are either recycled to the reactor core or are discharged or segregated.

BACKGROUND INFORMATION

The purpose of prior art procedures of the indicated kind — which is also the purpose of the present invention — is to segregate those fuel elements which are no longer suitable for reuse in the reactor, from still usable fuel elements. Fuel elements are no longer suitable for reuse when the fuel particles contained in the elements exhibit defects or are damaged because, considering the relatively high temperatures which prevail in the reactor core, damaged fuel particles result in the liberation of impermissible amounts of radioactive gas. The purpose of the invention is to segregate such damaged fuel elements so as to prevent that radioactive fission gases which are discharged from the fuel elements reach and thus contaminate the cooling gas circuit of the reactor.

A procedure for discriminating between and segregating spherical fuel elements of pebble bed nuclear reactors have previously been proposed, wherein the fuel spheres, after leaving the discharge conduit of the nuclear reactor, are heated in a furnace to temperatures just below 900°C, to wit, the operating temperature of the nuclear reactor.

After a sufficient heating period, which is required in order to attain a liberation of the fission gases corresponding to the equilibrium condition, this prior art procedure proposes the measurement of the gas liberation rate of the individual fuel elements at the indicated temperature and in a measuring chamber by means of a detector. For this purpose, the atmosphere which is contained in the measuring chamber, is pumped into a device for measuring gaseous fission products. In dependence on the thus obtained activity value of the discharged atmosphere, the fuel elements are again recycled to the reactor core or they are separated from the charging cuircuit (see Austrian Pat. No. 1,764,924). This prior art procedure has a significant disadvantage because, with a throughput of about 8 fuel spheres per minute, furnace and measuring chamber, due to the very strong radioactive radiation of the fuel elements, have to be automatically remote-controlled over a time period of several years. The plant arrangement proper and its structural elements have to be sealable in gas-tight manner relative to each other and also have to be gas-tight relative to the ambient space. Considering the high working temperatures which are required for this prior art procedure (about 900°C), the technical expenditure required is very considerable and many technical problems have to be considered. Further, with the required timing cycle of about 7.5 second, it is not possible to segregate fuel elements of which about 1 percent of the fuel particles contained therein are damaged. This is so because at the high working temperature of about 900°C, which has to be used in this known procedure, the liberation of fission gas, as is well known, amounts to about $10^9$ atoms per second. The prior art procedure, therefore, cannot successfully be used at a speed which corresponds to the flow or sluicing speed of the fuel elements through the reactor core, if the measurements are to be effected with the precision necessary for proper discrimination and segregation. If discrimination and segregation of the fuel elements are to be carried out within the same timing cycle at which the fuel elements leave the reactor core and are sluiced out from there, about 8 spherical fuel elements per minute have to be measured and segregated or sorted. This cannot be accomplished with the prior art procedure.

SUMMARY OF THE INVENTION

The primary object of the present invention is to overcome the disadvantages and drawbacks of the prior art procedure and to provide a method for discriminating between and sorting or segregating fuel elements of the indicated kind, which operates at considerably lower temperatures and which enables the determination of the activity with the necessary precision and the corollary segregation within a very short period of time, to wit, within the time period in which the fuel elements leave the reactor core.

Another object is to provide suitable apparatus for carrying out the method.

Still another object of the invention is to provide a procedure for the indicated purpose which can be carried out with an exceedingly simple apparatus, which does not require substantial technical expenditure and which is economical and easily operated.

The attainment of the above objects is based on the realization that the fission gas liberation in equilibrium condition at temperatures which are far below 900°C, does not substantially differ from the liberation of fission gases in the equilibrium which adjusts itself at a temperature of about 900°C.

Based on this realization, the invention briefly provides that the fuel elements, during a predetermined dwell period in a measuring space or chamber are individually maintained at a temperature of a few 100°C, well below 900°C, and are brought into contact with a predetermined amount of inert gas which flows or washes around the fuel elements during the dwell period, whereby the fission gas products which are given off by the individual fuel element intermingle with the inert gas, whereupon the activity of the thus obtained gas mixture is determined and the activity value is supplied to a process calculator. The process calculator, in dependence on a predetermined threshold or reference value then, by means of suitable conduits and control means either recycles the fuel element to the core of the reactor or segregates the fuel element. The inert gas may be helium or the like.

In accordance with this invention, it has been ascertained that it is entirely sufficient if the temperature during the dwell period is about 300°C. The fuel elements, after having been discharged through the discharge tube of the nuclear reactor and after having passed through the customary controls, thus enter the measuring chamber for contact with the inert gas at a temperature which is substantially the same as the temperature of the fuel elements at the time of the discharge from the nuclear reactor, to wit, about 300°C. Thus, the temperature in the measuring or furnace chamber is merely stabilized. It has been established that particularly favorable results are obtained if the dwell time for each fuel element within the measuring or furnace space is about 3 minutes. During this dwell time, the liberated fission gas is constantly washed by the inert gas through the measuring area of the detector or measuring means which latter determines the radioactivity, so that the radioactivity is accurately measured.

One of the major advantages of the inventive procedure is that the required gas-tight sealing of the structural parts of the arrangement relative to each other — as, of course, is necessary for successfully and safely carrying out the procedure — can be realized without difficulties. This is primarily due to the fact that the inventive procedure is performed at much lower temperatures than the temperatures of the prior art procedure. The same advantage, of course, applies to the required automatic remote servicing of the arrangement. Further, the life of the inventive arrangement for carrying out the inventive procedure is much longer than that of prior art devices, since the stresses on the arrangement are significantly decreased.

The performance of a preferred embodiment or variation of the inventive precedure is based on an additional realization as follows:

This realization is that the fission gas activity — which, as will be understood, is the criterion for discriminating or distinguishing between the individual fuel elements — can be effectively increased by utilizing the greatly increased fission gas discharge from the fuel element which, for a relatively short period of time, precedes the liberation of fission gases in the equilibrium condition at a given temperature, when the fuel element is heated to a predetermined temperature. Based on this realization, the temperature of the fuel element in this embodiment of the invention is raised during its dwell period in the measuring space, a procedure which thus results in a sudden and increased discharge of fission gas. The temperature increase relative to the temperature of the entering fuel element should be at least about 100°C in order to obtain a sufficiently large quantity of fission gas for the measuring. In a preferred embodiment, the temperature is raised to about 600°C. Thus, in this embodiment or variation of the inventive procedure, the operating or working temperature at which the measurement is performed during the dwell period, is about 300°C higher than the temperature of about 300°C at which the fuel elements are discharged from the reactor core through the discharge tube of the reactor. This relatively high temperature — which, however, is still far below the 900° C of the prior art procedure — results in the phenomenon that the greatly increased amount of liberated radioactive fission gases, caused by the gas discharge due to the temperature increase referred to, is washed into the detector or measuring means. This, in turn, results in a shortening of the mmeasuring time; and/or the measuring exactness is further increased.

An arrangement which is particularly suitable for carrying out both variations of the inventive procedure comprises a furnace having an interior space or chamber in which the measurement is carried out, to wit, into which the fuel elements are individually conveyed. The furnace, by suitable heating means, is heatable to a temperature of above 600°C. The inlet end of the furnace chamber communicates with the discharge for the fuel elements of the reactor by means of a thermally insulated, valve controlled conduit through which the individual fuel elements can thus be conveyed from the discharge of the reactor and sluiced into the furnace chamber. A valve controlled gas supply line for introducing predetermined amounts of inert gas into the furnace chamber is provided, the arrangement also including a gas discharge conduit or means for withdrawing the gas from the furnace chamber. The gas supply and discharge conduits are preferably connected to form a circulatory system through which the gas can thus be circulated or pumped through the chamber. A detector or measuring means which detects and measures the activity of the gas is provided in the gas discharge conduit. Such detectors are well known. The discharge end of the furnace chamber is connected to a valve controlled discharge conduit which has two discharge branches, to wit, a first branch which communicates with the reactor and a second branch which leads to a disposal area or the like. A switching device is arranged in the discharge conduit which, by means of a control, directs the fuel elements which are discharged from the furnace space either to the branch which is communicating with the reactor or to the second branch which leads to the disposal area. This control, in turn, is operatively connected to a calculating means in the nature of a comparison or threshold system whose input is supplied by the detector and which, in dependence on the information or measuring value supplied by the detector and after having compared this measuring value with a reference or threshold value, signals or directs the control to throw the switching device in the appropriate manner, to wit, either so that the respective fuel element is recycled to the reactor or is segregated and discharged.

In a preferred embodiment of the inventive arrangement, a furnace is used which has a plurality of measuring chambers, each of the measuring chambers being operatively connected with a detector or measuring means, so that several fuel elements can be tested at the same time. By suitably adapting the number of the chambers to the required measuring time, the desired discrimination, sorting and separation of the fuel elements can be accomplished within the same time period or timing cycle within which the fuel elements are discharged from the reactor core. Thus, the timing cycle for the discharge of fuel elements from the reactor core to the timing cycle of the measuring device can be readily adapted to each other so that intermediate storage of fuel elements is rendered unnecessary.

In order to reduce the consumption of inert gas to a minimum, the gas, as previously stated, is advantageously introduced into and discharged from the measuring chamber in an endless circuit, to wit, in circulatory manner. A gas purification arrangement is then advantageously positioned within the circuit.

The various features of novelty which characterize the invention are pointed out with particularity in the claims annexed to and forming part of this specification. For a better understanding of the invention, its operating advantages and specific objects attained by its use, reference should be had to the accompanying drawings and descriptive matter in which there are illustrated and described the preferred embodiments of the invention.

The single FIGURE of the drawings is a diagrammatical representation of an inventive arrangement suitable for carrying out the inventive procedure.

Referring now to the drawing, the arrangement, generally indicated by reference numeral 50, is operatively connected to the fuel element discharge of a nuclear reactor not shown. The discharged fuel elements are introduced from the reactor into a supply conduit 1 which thus communicates with the reactor discharge, the movement direction of the fuel elements being indicated by the arrow A on the left-hand side of the drawing. The supply conduit or channel 1 is thermally insulated, a lock or valve means 2 being arranged in conduit 1 for individually sluicing fuel elements from the conduit 1 into the furnace diagrammatically indicated by reference numeral 3. The lock or valve 2, of course, provides for the necessary gas-tight sealing. The furnace 3 is heatable to a temperature of above 600°C by suitable heating means and comprises an interior furnace chamber or measuring space 14. In practice, a plurality of such chambers 14 are provided within the furnace 3, each of the chambers then being selectively in communication with the channel or conduit 1. A fuel element, indicated by reference numeral 15, which has been conveyed through the conduit 1, is shown located in the chamber 14. The fuel element 15 enters the chamber 14 at a temperature which is about equal to the temperature at which the fuel element has been discharged from the reactor, which normally is about 300°C. Thus, the temperature of the fuel element at the time of entering the chamber 14 is about 300°C. The fuel element, by means of the heating of the furnace, is either maintained at the indicated temperature during its dwell time within the chammber, or the temperature of the fuel element is raised to about 600°C by raising the temperature of the furnace chamber. The dwell time of the fuel element within the chamber is advantageously about 3 minutes.

It will be noted that a circulatory conduit means, generally referred to by reference numeral 4, is provided which has a gas supply line 16 and a gas discharge line 17. The lines 16, 17 are interconnected by line 21, lines 16, 17 and 21 forming a circulatory system in conjunction with the chamber space 14, a compressor or pump 5 being provided to pump inert gas through the system. Inert gas, such as helium, may thus be flown through the chamber 14 in circulatory manner, the flow of the gas being assisted by the compressor 5, so that the gas is positively forced through the chamber and the system 4. A detector or measuring means 6 is operatively connected or positioned within the gas discharge line 17 of the circulatory gas supply means 4, the detector thus being flown through by the gases which pass from the chamber 14 into the line 17. Fission gases which are liberated from the fuel element 15 during its dwell time within the chamber 14, of course, intermingle with the inert gas flowing through the chamber so that a gas mixture is obtained whose radioactivity is measured by the detector or measuring means 6 within the line 17. Detectors for measuring the radioactivity of gases are well known in the art and the detector 6 may, for example, be in the nature of an ionization chamber, a scintillation counter or a flow proportional counter. A gas purification device indicated by reference numeral 17 and of a structure well known in the art may be arranged within the circulatory gas conduit 4, so that the gas can be reused after measurement has taken place. The measuring value or information which is ascertained by the detector 6 is supplied to an analyzer or process calculator 8 which may be in the nature of a comparison or threshold system and which compares the measuring value with a threshold or reference value. The analyzer 8, in dependence on the comparison, supplies a signal to a control unit 9.

The discharge end of the chamber 14 is connected with a discharge conduit 18 which has a lock or valve member 10 for discharging or sluicing the fuel element 15 from the chamber 14 and into the discharge conduit 18 after the dwell time and after the measurement has taken place. The discharge conduit 18 has two discharge branches, 19 and 20. Branch 19 leads to a disposal area, as indicated by the arrow 13, while branch 20 communicates with the reactor, as indicated by the arrow 12. A switching device 11 is arranged within the discharge conduit 18, which is movable between the position shown in the drawing in which the discharge conduit 18 is connected with branch 19 for discharge to the waste disposal area 13 and a position in which branch line 19 is blocked and the discharge line 18 is connected to the branch 20 which communicates with the reactor. The switching device 11 is operatively connected to the control 9 which, in dependence on the signal received from the analyzer 8, switches the switching device 11 in one of the indicated two manners. The intended discrimination, sorting and separation is thus easily effected in that the fuel element, after having been tested, is discharged from the chamber 14 into the discharge line 18 and is then further disposed of, in dependence on the measuring result, either by recycling to the reactor or by discharge to the disposal area.

EXAMPLE 1

A previously exposed fuel element 15 was introduced into the furnace chamber 14. The fuel element 15 entered the chamber at a temperature of about 300°C and was maintained at this temperature by the furnace heat. Pure helium was circulated in a closed circuit through the chamber by way of the circulatory system 4. The helium, which has a flow speed of about 40 liters per minute and which was forced through the system 4 and the chamber 14 by the compressor 5, thus washed around the fuel element 15. The gaseous fission products liberated from the fuel element adsorbed on charcoal (active carbon). The amounts of fission gases, — for example $Xe$ 133 —, adsorbed on the carbon were determined during the entire dwell period of the fuel element within the chamber 14. This was accomplished gamma-spectrometrically with a Naj-detector (see element 6) and the single-channel analyzer 8, which latter was operatively connected with the detector. At the indicated temperature of about 300°C, a completely undamaged fuel element liberates $5 \cdot 10^6$ atoms $Xe$ 133 per second. At a dwell period, to wit, measuring time of 3 minutes, thus about $9 \cdot 10^8$ atoms of $Xe$ 133 are available for the measurement. If 1 percent of the fuel particles of the fuel element are damaged, the fission gas liberation per second is about $5 \cdot 10^8$ atoms of $Xe$ 133. This corresponds to a total number of $Xe$ 133 atoms of $9 \cdot 10^{10}$ which are thus liberated during the 3-minute dwell time. Thus, the difference between an undamaged element and a fuel element of which 1 percent of the fuel particles are damaged, is by a factor of 100. Due to this great difference, discrimination and segregation of damaged fuel elements are readily possible within the indicated dwell period.

EXAMPLE 2

A second experiment was carried out with a different fuel element in substantially the same manner, but the temperature of the fuel element was raised to 600°C by the furnace heat. The fission gas discharge, which occurred at this temperature, was analogously determined and analyzed. During a dwell time of 3 minutes, the number of liberated atoms of $Xe$ 133 was about $1 \cdot 10^{10}$ for an undamaged fuel element and $1 \cdot 10^{12}$ for a fuel element having 1 percent of damaged fuel particles. Again, discrimination and segregation are easily accomplished within the indicated time period. Due to the increased liberation — as compared to Example 1 — the measuring exactness is still further increased. If a measuring exactness as obtained in Example 1 is deemed sufficient, the dwell period (measuring time) in this Example may be considerably shortened.

What is claimed is:

1. In a method of discriminating between and sorting fuel elements of nuclear reactors, wherein the fuel is in the form of coated fuel particles, such as spherical fuel elements, which are sluiced through the core of a high temperature nuclear reactor, and wherein the activity of the fuel elements is measured outside the core at a predetermined temperature whereupon, in dependence on the measured activity value, the fuel elementss are either returned to the core or are separated, the improvement which comprises:

a. maintaining each fuel element individually outside the core at a predetermined elevated temperature and for a predetermined dwell period in a measuring space;

b. contacting each fuel element within said measuring space during said dwell period with a predetermined amount of inert gas, whereby liberated fission gas products from said fuel element intermingle with said inert gas;

c. measuring the activity of the gas mixture thus obtained; and, d. in dependence on the measured value thus obtained, either returning the fuel element to the core of the reactor or discharging the fuel element.

2. The improvement of claim 1, wherein said predetermined elevated temperature is about 300°C.

3. The improvement of claim 1, wherein said predetermined elevated temperature is about 600°C.

4. The improvement of claim 1, wherein said predetermined elevated temperature is either about equal to the temperature at which the fuel element enters the measuring space, or is about twice as high.

5. The improvement of claim 1, wherein said dwell period is about 3 minutes.

6. The improvement of claim 1, wherein the activity of the gas mixture of step (c) is measured with a detector to produce a measured value, feeding the measured value to an analyzer for comparison of the measured value with a reference value and, in dependence on said comparison, either recycling said fuel element to the reactor or separating it.

7. The improvement of claim 1, wherein the temperature of the fuel element is raised during said dwell period.

8. The improvement of claim 7, wherein the temperature of said fuel element is raised during the dwell period by at least 100°C.

9. A method of discriminating between and sorting fuel elements of a nuclear reactor, wherein the fuel is in the form of coated fuel particles which comprises:

a. withdrawing the fuel elements from the reactor and conveying them, one at a time, into a measuring space;

b. maintaining the fuel element within said measuring space for a predetermined period of time and at a predetermined temperature while introducing a predetermined amount of inert gas into said measuring space, whereby discharged fission gas from said fuel element intermingles with said inert gas to form a gas mixture;

c. measuring the radioactivity of said gas mixture and, in dependence on the measured value, either recycling the fuel element to the reactor or separating it.

10. A method as claimed in claim 9, wherein said predetermined temperature is about 300°C, while said predetermined time period is about 3 minutes.

11. A method as claimed in claim 9, wherein said predetermined temperature is about 600°C, while said predetermined time period is about 3 minutes.

12. A method as claimed in claim 9, wherein said predetermined temperature is at least about 100°C higher than the temperature of the fuel element at the time of entering said space.

13. A method as claimed in claim 9, wherein a plurality of measuring spaces are provided, one fuel element being conveyed into each of said spaces, and the total number of fuel elements conveyed into the spaces being adapted to the timing cycle at which the fuel elements are withdrawn from the reactor.

14. An arrangement for discriminating between and sorting fuel elements of a nuclear reactor, wherein the fuel elements are in the form of coated fuel particles and wherein each fuel element is individually introduced into the furnace chamber of a heatable furnace and is removable therefrom through discharge means which either return the fuel element to the reactor or discharge it to a disposal area, the improvement which comprises:
 a. means for heating said furnace and thus said chamber to a temperature of about above 600°C;
 b. gas supply means for supplying inert gas to said furnace chamber;
 c. gas discharge means for discharging gas from said furnace chamber;
 d. detector means within said gas discharge means for detecting and measuring radioactivity; and
 e. means operatively connected to said detector means for directing each fuel element after its discharge from said furnace chamber either to the reactor or the disposal area, in dependence on the measuring value obtained by said detector means.

15. The improvement of claim 14, wherein said means (e) comprises analyzing means operatively connected to said detector means, control means operatively connected to said analyzing means and switch means arranged in the discharge from said furnace chamber and being capable of directing fuel elements either to said reactor or said disposal area, said switching means being operatively connected to said control means and controllable by said control means in response to directions obtained from said analyzing means.

16. The improvement as claimed in claim 14, wherein said furnace comprises a plurality of said furnace chambers, each of said furnace chambers being operatively associated with a detector means.

17. In combination with a nuclear reactor employing coated fuel particles as fuel elements and having a fuel element discharge, an arrangement for distinguishing between and sorting said fuel elements, in dependence on their radioactivity, said arrangement comprising:
 a. a heatable furnace having a furnace chamber with an inlet end and an outlet end;
 b. first valve controlled conduit means for establishing communication with the fuel element discharge of the reactor and the inlet end of said chamber;
 c. second valve controlled conduit means, said second valve controlled conduit means having an end portion connected to the outlet end of said furnace chamber and forming first and second branches, said first branch communicating with said reactor and said second branch communicating with a disposal area;
 d. switch means within said second valve controlled conduit means for selectively establishing communication between said end portion of said second valve controlled conduit means and said first branch and thus said reactor and said end portion of said second valve controlled conduit means and said second branch and thus said disposal area;
 e. gas supply means for supplying inert gas to said furnace chamber;
 f. gas discharge means for discharging gas from said furnace chamber;
 g. measuring means within said gas discharge means for measuring radioactivity of gas flowing through said gas discharge means;
 h. an analyzer operatively connected with said measuring means for comparing the measured value supplied by said measuring means with a threshold value; and
 i. control means operatively connected to said analyzer and said switch means, said control means selectively switching said switch means, in dependence on directions received by said control means from said analyzer means.

18. An arrangement as claimed in claim 17, further comprising means for heating said furnace and said furnace chamber to between about 300° to 600°C.

19. An arrangement as claimed in claim 17, wherein said first valve controlled conduit means is a thermally insulated conduit member extending between the inlet end of said furnace chamber and the fuel element discharge of said reactor and a lock arranged within said conduit member.

20. An arrangement as claimed in claim 17, further comprising conduit means for connecting said gas supply means (e) and said gas discharge means (f) with each other to form a gas circulation means through which gas can be continuously circulated through said furnace chamber.

21. A arrangement as claimed in claim 20, further comprising gas purification means within said gas circulation means.

* * * * *